United States Patent
Kawashima et al.

[11] Patent Number: 5,923,366
[45] Date of Patent: *Jul. 13, 1999

[54] APPARATUS AND METHOD FOR CALIBRATING VIDEO DISPLAYS

[75] Inventors: Toshiyuki Kawashima, N. Huntingdon, Pa.; Mie Tomiuka; Tatsuya Watanabe, both of Tokyo, Japan

[73] Assignees: Sony Corporation, Tokyo, Japan; Sony Electronics, Inc., Park Ridge, N.J.

[ * ] Notice: This patent is subject to a terminal disclaimer.

[21] Appl. No.: 08/869,126

[22] Filed: Jun. 4, 1997

Related U.S. Application Data

[51] Int. Cl.$^6$ .................................................. H04N 17/00
[52] U.S. Cl. ........................... 348/190; 348/745; 348/806
[58] Field of Search .................................... 348/181, 189, 348/190, 191, 745, 746, 806, 807, 747; 315/368.11

[56] References Cited

U.S. PATENT DOCUMENTS 4,857,998  8/1989  Tsujihara et al. ....................... 358/60
4,999,703  3/1991  Henderson .............................. 358/60

*Primary Examiner*—Andrew I. Faile
*Assistant Examiner*—Alexander Berhe
*Attorney, Agent, or Firm*—Frommer Lawrence & Haug, LLP.; William S. Frommer

[57] ABSTRACT

A system for performing beam convergence in video displays. The system is implemented through one or more convergence sensors, which are exposed to two distinct convergence test patterns. The first test pattern partially overlaps with one or more of the sensors to define a first covered area for each overlapped sensor, the portion of each sensor that is not overlapped defining a first uncovered area. The second test pattern overlaps the entirety of the first uncovered area for each sensor, the portion of each sensor that is not overlapped, therefore being the first covered area for each sensor. The output of the sensors when exposed to the first test pattern and the output of the sensors when exposed to the second test pattern are used to perform beam convergence calculations. The test patterns are selected in such a manner as to reduce the dynamic range requirement for the sensor output A/D converter(s).

2 Claims, 9 Drawing Sheets

NO PATTERN

NO PATTERN

APPARATUS AND METHOD FOR CALIBRATING VIDEO DISPLAYS

FIELD OF THE INVENTION

This invention relates to video displays, and more particularly to performing convergence calibration in video displays.

BACKGROUND OF THE INVENTION

It is well known in the field of video displays to generate pictures on a screen by combining multiple beams of light. For example, a typical rear projection color television set includes three cathode ray tubes (CRTs), each CRT processing one of the primary colors—red, blue or green. By combining the three monochromatic beams the set can produce full color television pictures. However, in order for the set to produce accurate pictures, proper alignment of the beams must be maintained. That is, the CRTs must be calibrated so that their beams are focused at the same point on the screen. Accordingly, the calibration of the CRTs is often referred to as a convergence procedure, and beam alignment is often referred to as convergence. For a more detailed discussion of convergence, references are made to FIGS. 1 and 2.

FIG. 1 is a plan view of a model rear projection television set. The components of the set are housed within a cabinet 10, and they include: a CRT 12, a lens 14, a mirror 16, and a screen 18. The model set includes three CRTs and multiple lenses for each CRT, although for clarity, only a single CRT and a single lens are shown in the figure. The light from the CRT passes through the lens and illuminates the mirror which, in turn, reflects the light onto the screen for observation by the viewer.

FIG. 2 illustrates the relationship between the three CRTs of the model set. As can be seen from the figure, CRTs 12, 20 and 22 are matched respectively with lenses 14, 24 and 26, and the CRTs are aligned so that their beams converge. To maintain the alignment of the beams one or more photosensors are typically provided at the periphery of the screen. An example is shown in FIG. 3.

FIG. 3 includes an arrangement of four photosensors, 28, 30, 32 and 34. The sensors are located inside the cabinet and are not visible to the viewer. Also, the sensors are located behind a screen frame 36, which is not part of the display screen, and therefore the sensors do not interfere with images displayed on the screen. Nevertheless, the sensors are located within the area that can be scanned by the CRTs.

FIG. 4A shows the relationship between sensors 28–34, screen 18, and a CRT scannable area 38 as seen from the viewer's perspective. For clarity the screen frame is not shown. When performing the convergence procedure, test patterns are produced within the scannable area and detected by the sensors. More specifically, each CRT produces two test patterns, a wide pattern and a narrow pattern. Thus, to complete the convergence procedure the following patterns are produced: red-wide, red-narrow, blue-wide, blue-narrow, green-wide, and green-narrow. These patterns and their function are discussed in more detail in connection with FIGS. 4B–4E.

FIGS. 4B–4E show illustrative test patterns as generated by any one of the primary color CRTs. In the interest of brevity, FIGS. 4B–4E are discussed in the context of the red CRT only. However, it should be noted that the discussion is equally applicable to the other primary color CRTs.

FIGS. 4B and 4C show test patterns that are generated when the red CRT is properly aligned with the center of the screen. FIG. 4B shows a red-wide pattern 40 and its relative position to the scannable area, screen, and sensors. As can be seen from the figure, the red-wide pattern is made up of four illuminated areas that define a rectangle (indicated by the dotted line). Each illuminated area overlaps the entirety of one sensor. The center point of the scannable area is denoted by "o" and the center of the rectangle defined by the red-wide pattern is denoted by "x". Since the red CRT is properly aligned, the o and x coincide.

FIG. 4C shows a red-narrow pattern 42. As in the case of the wide pattern, since the CRT is properly aligned, the x and o coincide. However, in the case of the narrow pattern, only one half of each of the sensors are overlapped by the pattern. The relative sensor overlap in the wide pattern and narrow pattern cases is key to maintaining alignment of the CRT, and will be discussed in more detail below. First, FIGS. 4D and 4E are referred to in order to show the effect of misalignment on the test patterns.

FIG. 4D shows a red-wide pattern 44 that is generated when the red CRT is misaligned by an amount $\delta$ in the horizontal direction (left of center from the viewer's perspective). Since the pattern is sufficiently wide, it still overlaps the entirety of each of the sensors. FIG. 4E shows red-narrow pattern 46 that is generated when the red CRT is misaligned by an amount $\delta$ in the horizontal direction (left of center from the viewer's perspective). In FIG. 4E, since the pattern is narrow, the sensor overlap is changed relative to the overlap shown in FIG. 4C. As will be described below, this change in overlap is used to determine the amount of misalignment, which is, in turn, used as an error signal for the purpose of correcting the misalignment.

The amount of beam misalignment at a position defined by a given sensor is determined by observing that sensor's readings when exposed to the wide and narrow patterns. The observed readings are used to form a ratio which is then compared to a desired ratio, the desired ratio being the ratio obtained for the sensor under no misalignment conditions. The difference between the measured ratio and the desired ratio indicates the amount of beam misalignment. Described below is an illustrative misalignment determination as performed by sensor 28.

FIGS. 5A–5E show the relationship between sensor 28 and various test patterns. FIG. 5A depicts the sensor in a no pattern condition. FIGS. 5B–5E show the sensor as illuminated by the patterns of FIGS. 4B–4E, respectively. To measure the misalignment, the light incident on sensor 28 is measured for each of the wide and narrow cases and a ratio of the two is computed. The value of the ratio in the no misalignment case is the desired ratio, and it is obtained in the following manner: the sensor reading under no pattern conditions (noise) is subtracted from the sensor reading under wide-pattern/no-misalignment conditions (FIG. 5B) to generate a first difference; the sensor reading under no pattern conditions is subtracted from the sensor reading under narrow-pattern/no-misalignment conditions (FIG. 5C) to generate a second difference; and the second difference is divided by the first difference. To obtain the value of the ratio for the depicted misalignment: the sensor reading under no pattern conditions (noise) is subtracted from the sensor reading under wide-pattern/$\delta$-misalignment conditions (FIG. 5D) to generate a first difference; the sensor reading under no pattern conditions is subtracted from the sensor reading under narrow-pattern/$\delta$-misalignment conditions (FIG. 5E) to generate a second difference; and the second difference is divided by the first difference. The difference between the two ratios thus obtained indicates the amount of misalignment. The red CRT is then adjusted until the ratios match. A similar procedure is executed for the other primary beams and in this way convergence is achieved.

OBJECTS AND SUMMARY OF THE INVENTION

It has been recognized that in order to achieve precise convergence the ratio calculation must be performed with a high degree of accuracy. For this purpose the calculations are typically performed digitally. However, to perform the calculations digitally the sensor readings must first be passed through an A/D converter, which introduces quantization noise into the sensor measurements and thereby degrades the convergence precision. To minimize the quantization noise introduced by the A/D converter, a high resolution A/D converter is required.

It has been further recognized that the complexity and cost of high resolution A/D converters increases with the dynamic range required of the converters. Thus, by decreasing the A/D converter dynamic range required by the convergence procedure, a less expensive A/D converter may be used without sacrificing convergence accuracy. That is, by relaxing the convergence system's dynamic range requirement, the designer may trade off some A/D dynamic range for increased A/D resolution, while keeping the price of the A/D converter constant and maintaining the accuracy of convergence calculations.

It is therefore an object of the invention to provide a convergence procedure apparatus and a convergence procedure method that can reduce the dynamic range required of A/D converters used for convergence calculations.

The invention employs one or more convergence sensors, which are exposed to two distinct convergence test patterns. The first test pattern partially overlaps with one or more of the sensors to define a first covered area for each overlapped sensor, the portion of each sensor that is not overlapped defining a first uncovered area. The second test pattern overlaps the entirety of the first uncovered area for each sensor, the portion of each sensor that is not overlapped, therefore being the first covered area for each sensor. The output of the sensors when exposed to the first test pattern and the output of the sensors when exposed to the second test pattern are used to perform beam convergence calculations. The test patterns are selected in such a manner as to reduce the dynamic range requirement for the sensor output A/D converter(s).

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 6A–6D show the relationship between the sensors, the display screen, the scannable area, and several test patterns in accordance with the invention.

DETAILED DESCRIPTION OF CERTAIN PREFERRED EMBODIMENTS

FIGS. 6A–6D show illustrative beam convergence test patterns generated according to a preferred embodiment of the invention. Although the test patterns depicted in the figures may be generated by any one of the CRTs, they will be discussed in the context of the red CRT for clarity of presentation.

Figure 6A:
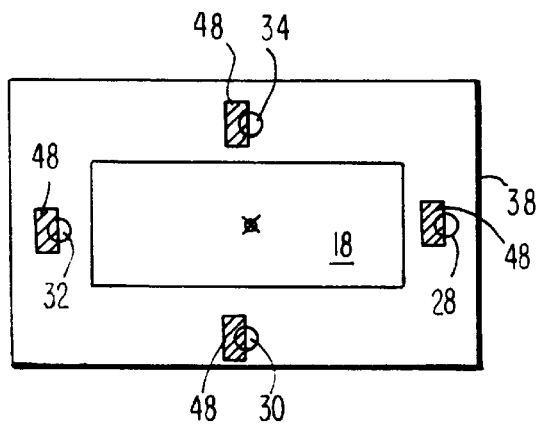
Figure 6B:
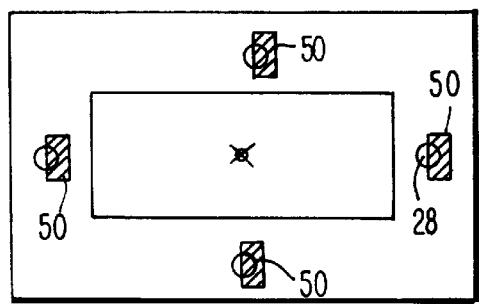

FIGS. 6A and 6B show the test patterns generated by the red CRT when it is properly aligned. FIG. 6A shows a first test pattern 48 which overlaps a left side portion (from the viewer's perspective) of each sensor. FIG. 6B shows a second test pattern 50 which overlaps a right side portion of each sensor. As was the case in FIGS. 4A–4E, "o" indicates the center of the screen and "x" indicates the center of the rectangle defined by the test patterns. The "o" and "x" coincide in FIGS. 6A and 6B since these figures represent the case of proper beam alignment.

Figure 6C:
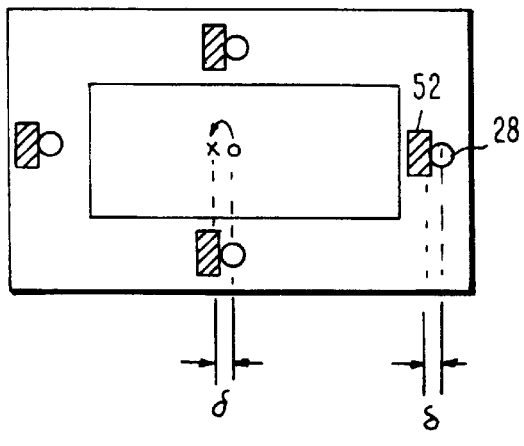
Figure 6C:
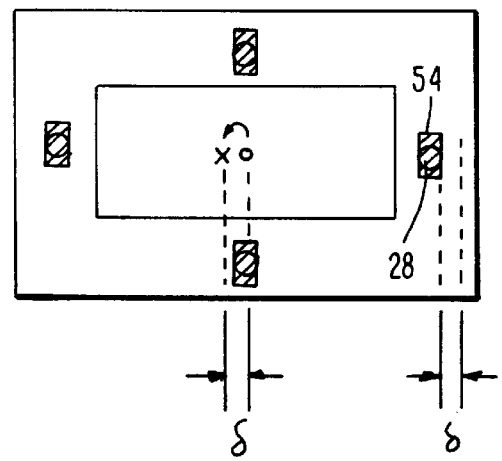

FIGS. 6C and 6D show a shifted first test pattern 52 and a shifted second test pattern 54, respectively. The shifted first pattern is the pattern that results when the CRT is misaligned and attempts to generate the first pattern. The shifted second pattern is the pattern that results when the CRT is misaligned and attempts to generate the second pattern. In both of FIGS. 6C and 6D, the CRT is misaligned by an amount δ in the horizontal direction (left of center from the viewer's perspective).

As can be seen from FIGS. 6A–6D, the effect of the misalignment on the first pattern is to shift the pattern (FIG. 6C) so that its overlap with sensor 28 significantly less than it was in the no-misalignment case (FIG. 6A). Whereas the effect of the misalignment on the second pattern is to shift the pattern (FIG. 6D) so that its overlap with sensor 28 is significantly greater than it was in the no-misalignment case (FIG. 6B). As will be described below, the overlap changes for the two test patterns that occur as a result of misalignment are used to determine the amount of misalignment. The amount of misalignment is then, in turn, used as an error signal for the purpose of correcting the misalignment.

The amount of misalignment is determined by observing the sensor readings as the sensor is exposed to the first and second patterns. The readings obtained are used to form a measured ratio that is compared to a desired ratio, the desired ratio being the ratio obtained for the sensor under no misalignment conditions. The difference between the measured ratio and the desired ratio indicates the amount of beam misalignment at the sensor's location. What follows is a description of an illustrative misalignment determination as performed on the basis of readings taken through sensor 28.

Figure 7A:
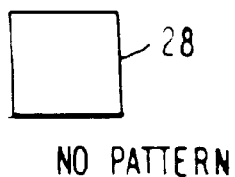
FIG. 7A is a representation of an unilluminated sensor.

FIGS. 7A–7E show the relationship between sensor 28 and various test patterns. FIG. 7A depicts the sensor in a no pattern condition. FIGS. 7B–7E show the sensor as illuminated by the patterns of FIGS. 6A–6D, respectively. To measure the misalignment, the light incident on sensor 28 is measured for each of the first pattern and second pattern measurements are used to form a ratio. The value of the ratio in the no misalignment case is the desired ratio, and it is a design parameter for the television set. To obtain the value of the desired ratio: the sensor reading under no pattern conditions (noise) is subtracted from the sensor reading under first-pattern/no-misalignment conditions (FIG. 7B) to generate a first difference; the sensor reading under no pattern conditions is subtracted from the sensor reading under second-pattern/no-misalignment conditions (FIG. 7C) to generate a second difference; the first difference is added to the second difference to form a sum; and the first difference is divided by the sum. To obtain the value of the ratio for the depicted misalignment: the sensor reading under no pattern conditions (noise) is subtracted from the sensor reading under first-pattern/δ-misalignment conditions (FIG. 7D) to generate a first difference; the sensor reading under no pattern conditions is subtracted from the sensor reading under second-pattern/δ-misalignment conditions (FIG. 7E) to generate a second difference; the first difference is added to the second difference to form a sum; and the first difference is divided by the sum. The difference between the two ratios thus obtained indicates the amount of misalignment. The red CRT is then adjusted until the ratios match. A similar procedure is executed for the other primary beams and in this manner convergence about sensor 28 is achieved. Finally, similar procedures may then be executed about the other sensors to complete an overall convergence procedure.

By using the test patterns of the present invention the dynamic range required of the sensor A/D converters is reduced. Thereby, allowing convergence procedures to be performed through more cost efficient hardware. To illustrate how the dynamic range requirement is reduced reference is made to FIGS. 5A–5E and 7A–7E.

Figure 1:
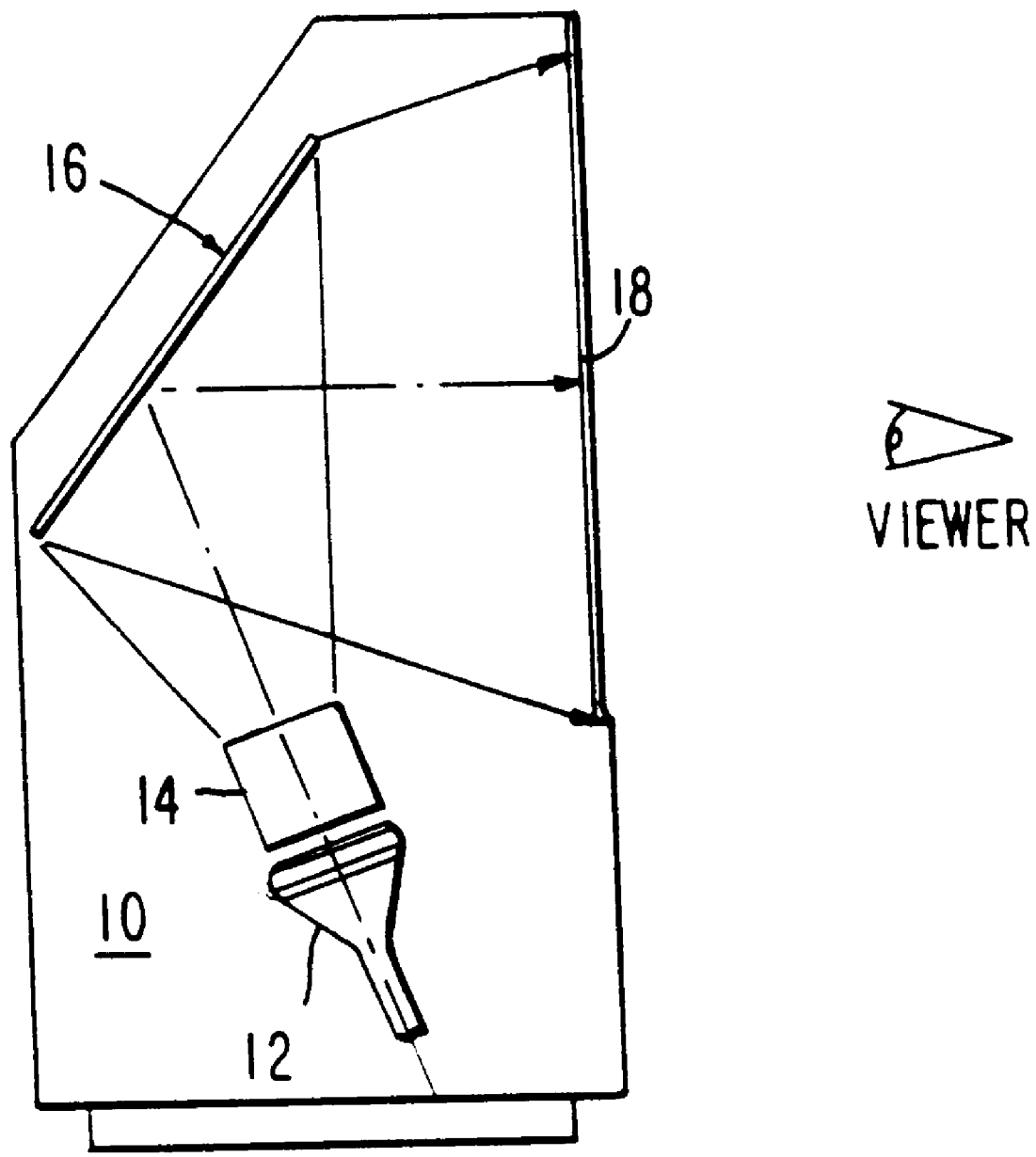
FIG. 1 is a plan view of a typical rear projection television set.
Figure 2:
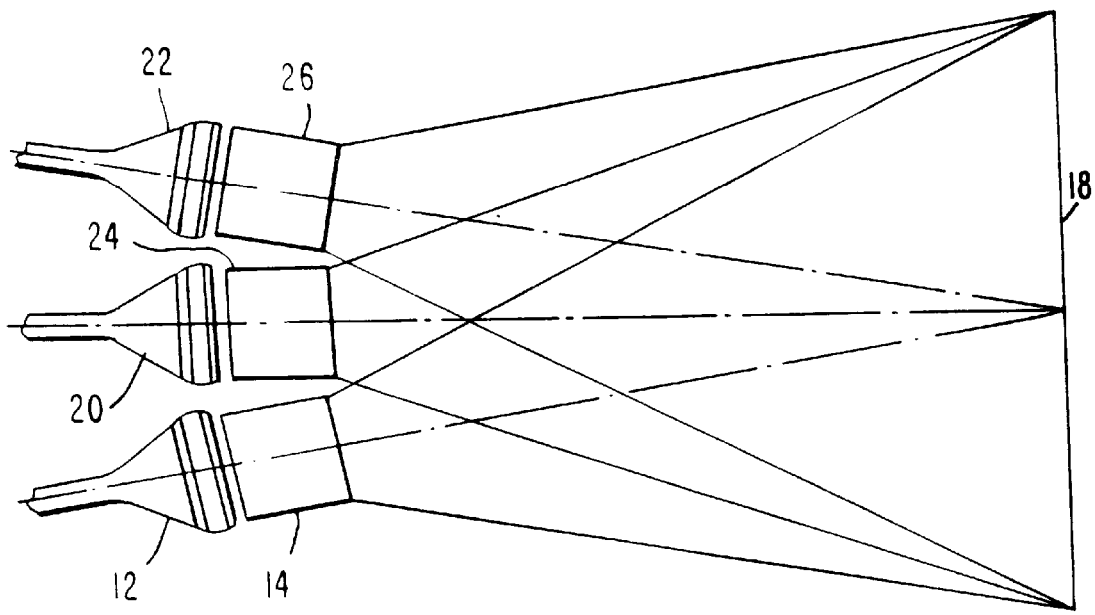
FIG. 2 illustrates the relationship between the three CRTs of the FIG. 1 set.
Figure 3:
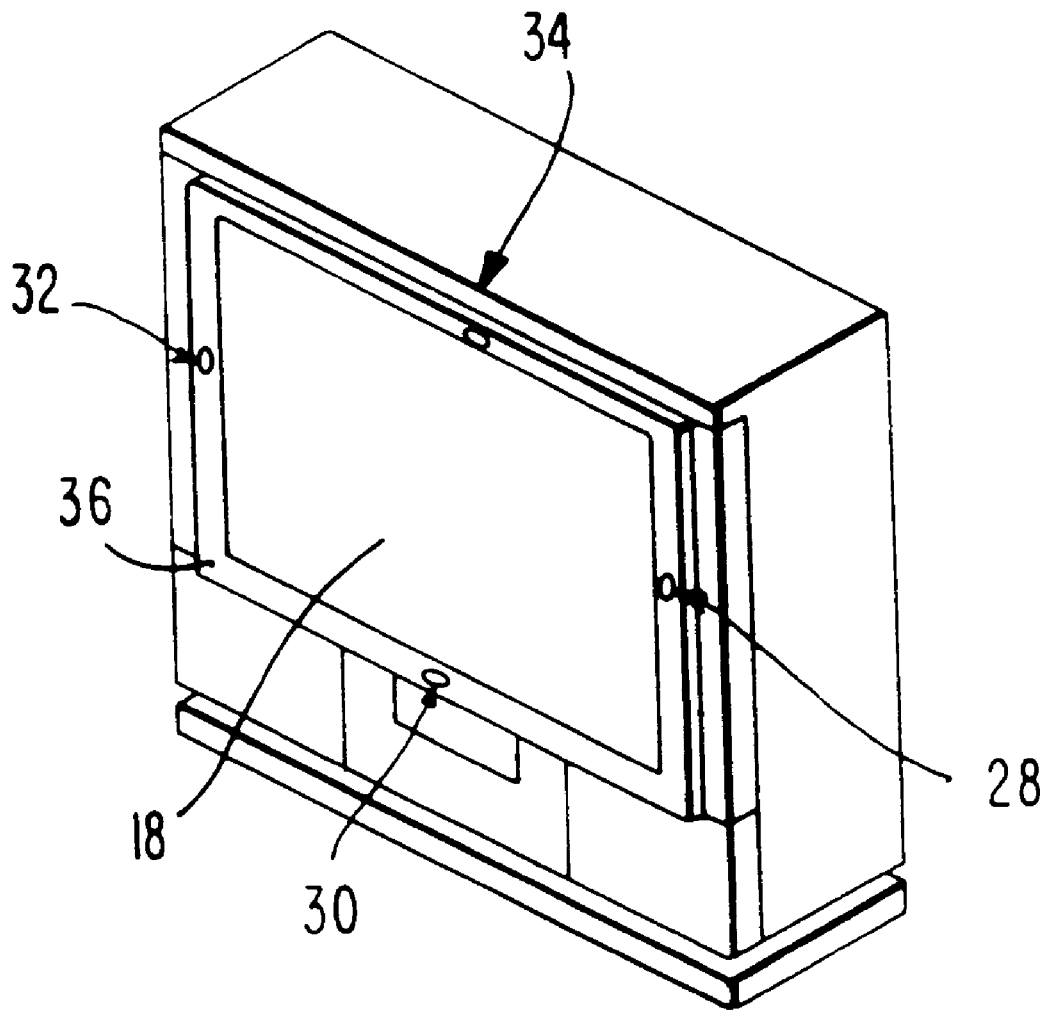
FIG. 3 shows how photosensors are typically arranged around a screen for purposes of maintaining beam convergence.
Figure 4A:
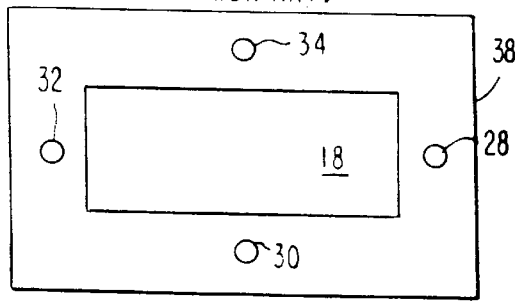
FIG. 4A shows the typical relationship between a plurality of convergence sensors, a display screen, and a CRT scannable area.
Figure 4B:
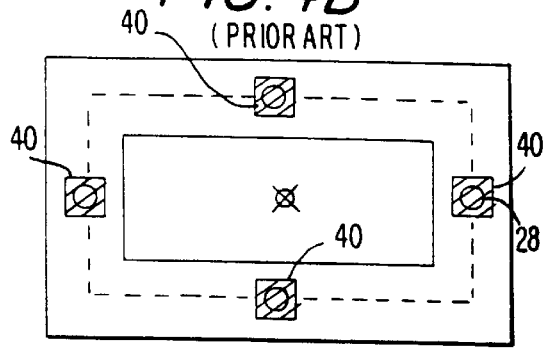
FIGS. 4B–4E show the typical relationship between the sensors, the display screen, the scannable area, and several test patterns.
Figure 4C:
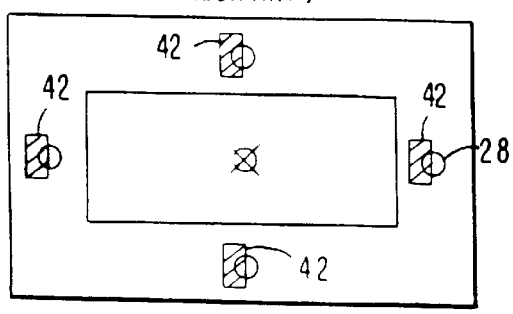
Figure 4D:
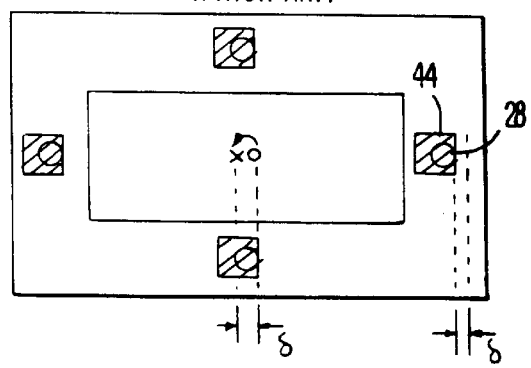
Figure 4E:
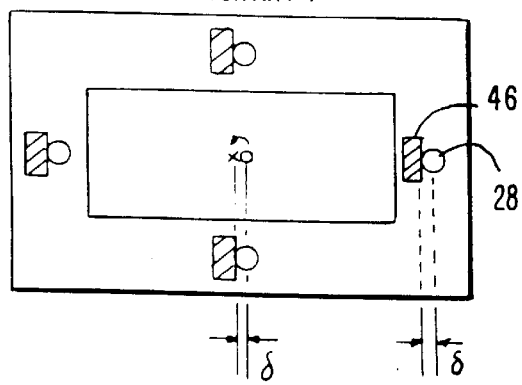
Figure 5A:
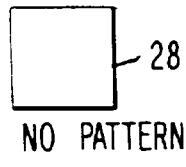
FIG. 5A is a representation of an unilluminated sensor.
Figure 5B:
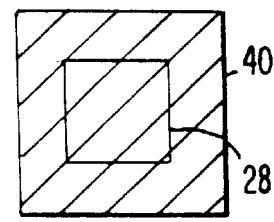
FIGS. 5B–5E are representations of the sensor of FIG. 5A as illuminated by the test patterns of FIGS. 4B–4E, respectively.
Figure 5C:
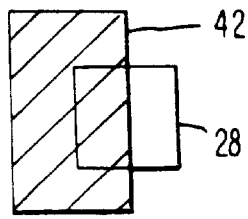
Figure 5D:
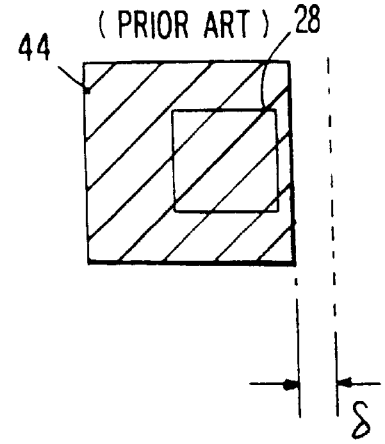
Figure 5E:
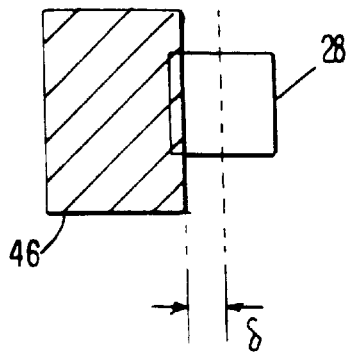

As mentioned above, A/D converters are employed to convert the output of convergence sensors from analog signals to digital signals. In prior systems, the analog sensor signals that had to be converted by the A/D converters ranged from the signal generated when the sensor was fully illuminated to the signal generated when the sensor was not illuminated at all. For example, in prior systems, the signal obtained from the unilluminated sensor in FIG. 5A and the signal from the fully illuminated sensor in FIG. 5D are both converted to digital signals so that they can be used to calculate the convergence ratio. However, in the present invention, a sensor A/D converter does not have to convert the signal from a fully illuminated sensor.

In a preferred embodiment of the present invention, the first and second test patterns are chosen such that for any given sensor the areas of the sensor overlapped by the first and second patterns are complimentary. That is, the area not overlapped by the first pattern is equal to the area overlapped by the second pattern; and the area not overlapped by the second pattern is equal to the area overlapped by the first pattern. Thus, a value for a fully illuminated sensor may be obtained by adding the digitally converted output generated during illumination by the first pattern to the digitally converted output generated during illumination by the second pattern, without actually fully illuminating the sensor. Indeed, as will be explained with references to FIGS. 7B–7E, the maximum sensor illumination is close to 50%.

Figure 7B:
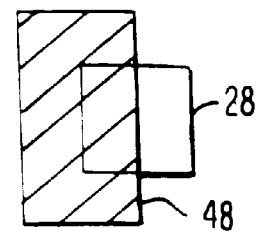
FIGS. 7B–7E are representations of the sensor of FIG. 7A as illuminated by the test patterns of FIGS. 6A–6D, respectively.
Figure 7C:
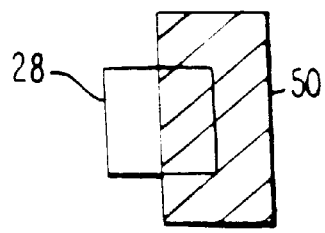
Figure 7D:
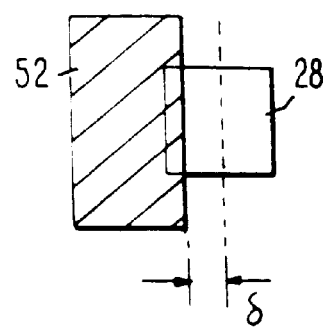
Figure 7E:
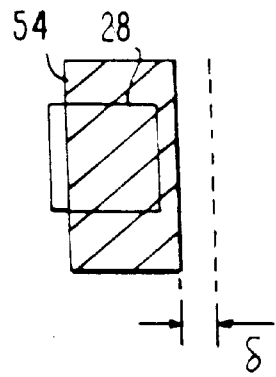

Regarding sensor illumination in the no-misalignment case, it can be seen from FIGS. 7B and 7C that the maximum signal that must be converted in the no-misalignment case is the signal corresponding to approximately 50% illumination. Regarding sensor illumination in the δ-misalignment case, it can be seen from FIG. 7E that the maximum signal that must be converted is somewhat more than the signal corresponding to approximately 50% illumination. However, the amount of misalignment δ is typically small compared to the size of the sensor, and therefore the magnitude of the signal will not be significantly larger than the signal corresponding to 50% sensor illumination. Thus, the reduction in A/D dynamic range requirement provided by the present invention is on the order of 50%.

Figure 8:
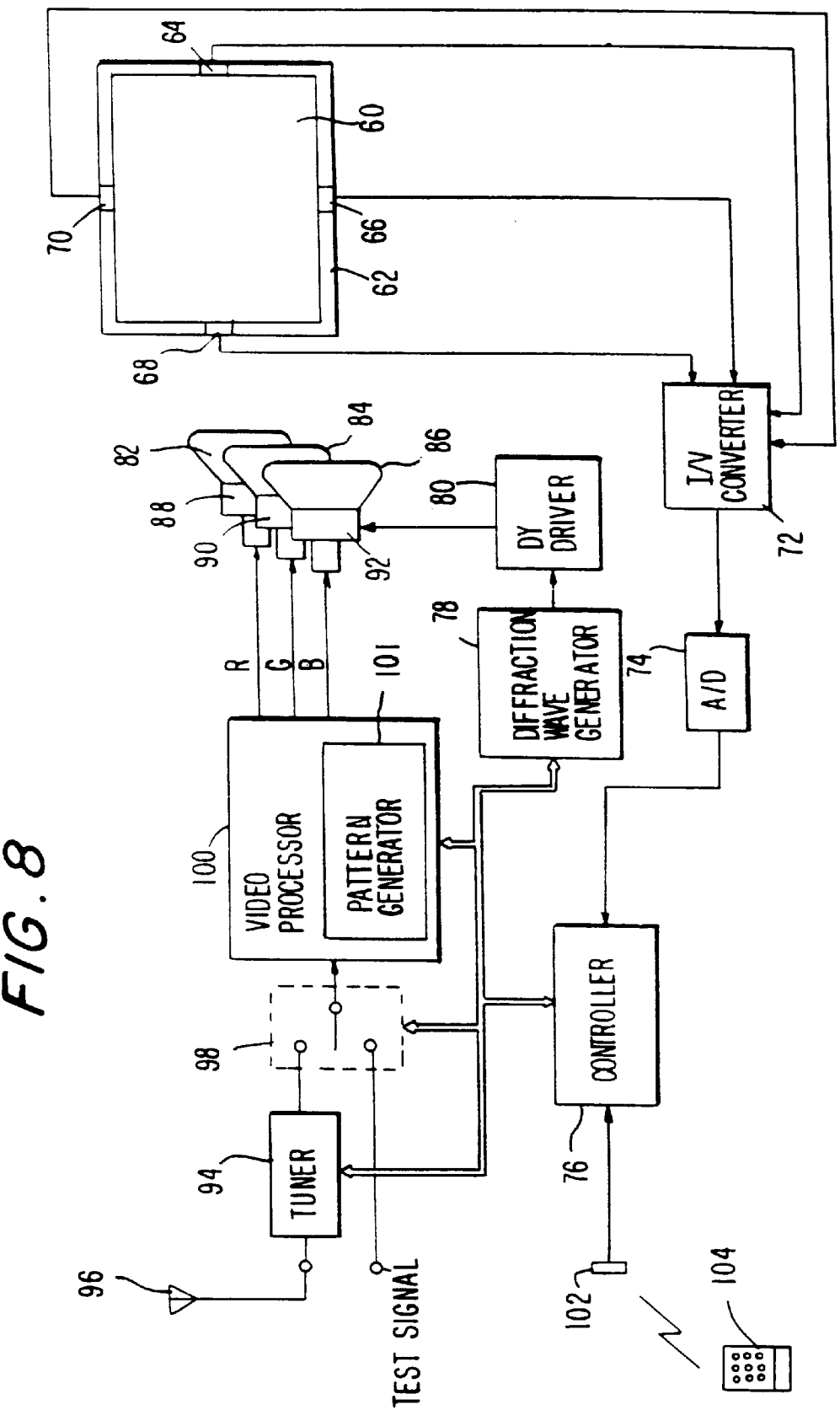
FIG. 8 is a schematic diagram of a television system according to the invention.

A schematic diagram of a television system according to the invention is shown in FIG. 8. The system includes a television screen 60 and three CRTs 82, 84 and 86 for forming images on the screen. Each CRT emits a beam of monochromatic light in one of the primary colors (red, blue and green), and each includes a deflection yoke, 88, 90 and 92, respectively. Control of the CRTs for the purpose of forming images on the screen is performed by a video processor 100. Accordingly, the video processor includes a pattern generator 101 for forming the convergence test patterns. Convergence adjustment of the CRTs is performed through a deflection yoke driver 80. Since the invention concerns convergence operations, the convergence portion of the system will be emphasized.

The system includes four convergence photosensors, 64, 66, 68 and 70. These sensors are located at the periphery of the screen, behind a screen frame 62. During convergence operations, the sensors generate analog current signals which are passed to a current to voltage converter 72. The current to voltage regulator converts the current signals to analog voltage signals and relays the voltage signals to an A/D converter 74. The A/D converter receives the analog voltage signals, converts them to digital voltage signals, and passes the digital voltage signals to a controller 76. The controller then uses the digital voltage signals to perform the convergence calculations and determine the amount of any necessary beam alignment corrections. If correction is required, the controller sends appropriate correction signals to a diffraction wave generator 78. The correction signals received by the diffraction wave generator are converted into driver signals which are, in turn, passed to the diffraction yoke driver. The driver then generates one or more deflection yoke control signals and applies them to the CRT deflection yokes. Through repeated beam adjustment by way of the deflection yokes, proper beam alignment is maintained.

In addition to the above-identified elements, the television system of FIG. 8 includes a tuner 94, an antenna 96, a switch 98, and an infrared receiver 102. The tuner is used for receiving television signals, such as broadcast signals, through the antenna. These signals are coupled to the video processor by switch 98. However, the switch may deselect the tuner in favor of a test signal for purposes of testing the system. Infrared receiver 102 is provided to allow for remote control of the system via remote control unit 104.

While the present invention has been particularly shown and described in conjunction with preferred embodiments thereof, it will be readily appreciated by those of ordinary skill in the art that various changes may be made without departing from the spirit and scope of the invention. For example, for one or more sensors used in a convergence procedure, the area overlapped by the first test pattern when added to the area overlapped by the second test pattern does not need equal the entire area of the sensor(s), but rather may be equal to some other predetermined area.

Figure 9:
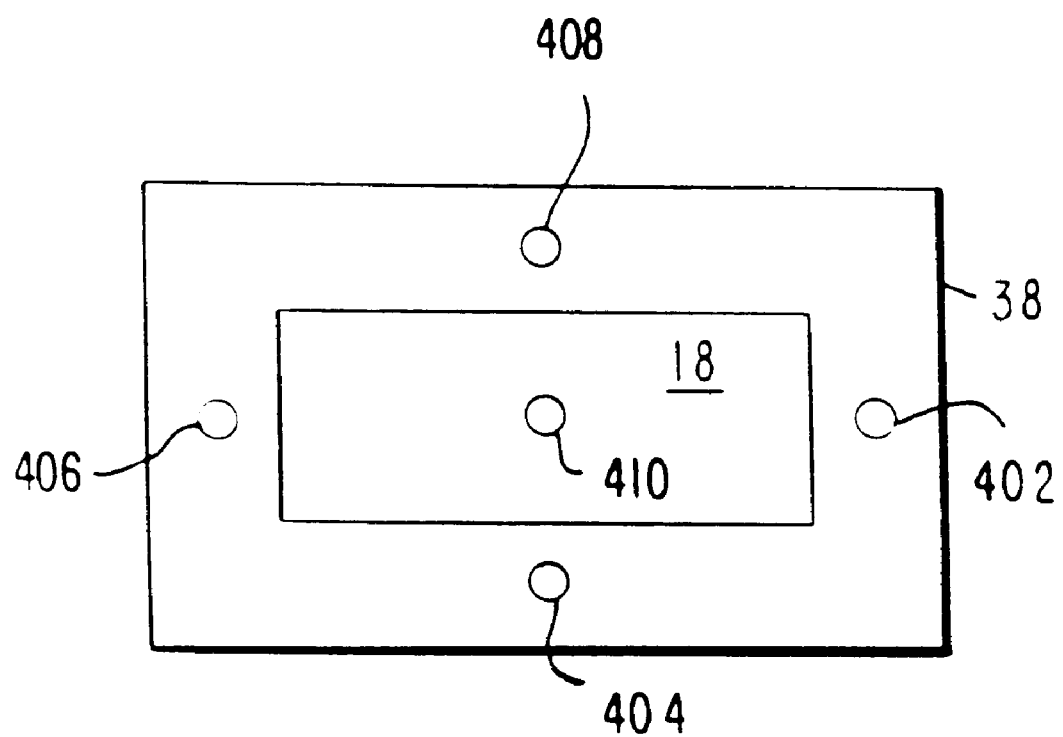
FIG. 9 shows the relationship between sensors, display screen, and scannable area for an alternative sensor arrangement in accordance with the invention.

Moreover, sensor arrangements other than those described above may be employed. For example, sensors may be arranged as shown in FIG. 9. In the FIG. 9 configuration, five sensors are employed, 402–410, sensor 410 being located at the center of the screen. Convergence testing is conducted in the same manner as described above with the exception that the test patterns include five illuminated areas.

Furthermore, the invention is applicable to many types of video displays and is not limited to rear projection television sets. For example, the invention may be employed in computer system monitors.

Therefore, it is intended that the appended claims be interpreted as including the embodiments described herein, the alternatives mentioned above, and all equivalents thereto.

What is claimed is:

1. Apparatus for performing convergence calibration in a system that uses multiple beams to generate a video display on a screen, comprising:

at least one photo sensor;

means for generating a first test pattern which partially overlaps with said at least one sensor to define a first covered area for each said at least one sensor, and for generating a second test pattern which partially overlaps with said at least one sensor to define a second covered area for each said at least one sensor, said second covered area being different from said first covered area for each said at least one sensor;

wherein for each beam, a first output is generated by said at least one sensor when said first test pattern is generated, and a second output is generated by said at least one sensor when said second test pattern is generated; and means for determining alignment of said beams on the basis of said first output and said second output.

2. The apparatus according to claim 1, wherein when no test pattern is generated a no pattern output is generated by said at least one sensor, and wherein said alignment of said beams is determined on the basis of said first output, said second output, and said no pattern output.

* * * * *